United States Patent [19]
Casorso et al.

[11] Patent Number: 5,404,361
[45] Date of Patent: Apr. 4, 1995

[54] METHOD AND APPARATUS FOR ENSURING DATA INTEGRITY IN A DYNAMICALLY MAPPED DATA STORAGE SUBSYSTEM

[75] Inventors: Anthony J. Casorso, Westminster; David P. Haldeman, Broomfield, both of Colo.

[73] Assignee: Storage Technology Corporation, Louisville, Colo.

[21] Appl. No.: 919,897

[22] Filed: Jul. 27, 1992

[51] Int. Cl.6 .......................................... H03M 13/00
[52] U.S. Cl. ................................ 371/40.1; 395/575
[58] Field of Search ................. 371/40.1, 21.6, 10.1, 371/21.1, 9.1, 51.1, 2.2; 395/425, 400, 575

[56] References Cited

U.S. PATENT DOCUMENTS

| | | | |
|---|---|---|---|
| 4,716,605 | 4/1990 | Beardsley et al. | 395/425 |
| 5,077,736 | 12/1991 | Dunphy, Jr. et al. | 371/10.1 |
| 5,210,866 | 3/1993 | Milligan et al. | 395/575 |

Primary Examiner—Charles E. Atkinson
Assistant Examiner—Phung Chung
Attorney, Agent, or Firm—Duft, Graziano & Forest

[57] ABSTRACT

The dynamically mapped data storage subsystem generates a two error correction, three error detection code of extent sufficient to cover not only the data but also the corresponding memory address for each data record stored therein. The error correction code is transmitted and stored with the data within the data storage subsystem to ensure the integrity of both the data and its memory address.

10 Claims, 6 Drawing Sheets

METHOD AND APPARATUS FOR ENSURING DATA INTEGRITY IN A DYNAMICALLY MAPPED DATA STORAGE SUBSYSTEM

FIELD OF THE INVENTION

This invention relates to dynamically mapped data storage subsystems and, in particular, to a method and apparatus for confirming the integrity of data and its corresponding address.

PROBLEM

It is a problem in dynamically mapped data storage subsystems to maintain accurate mapping information to denote the correspondence between data records received from a host computer and identified by a virtual address and the physical memory location in which the data is stored. This problem is particularly relevant with regard to the address information that is used to control the physical storage of data on the data storage devices used within the dynamically mapped data storage subsystem. A failure to accurately identify the physical storage location of the data results in the loss of the data since it cannot be properly retrieved by the data storage subsystem from the data storage devices.

One example of a dynamically mapped data storage subsystem is a disk array system which stores data on a plurality of small form factor disk drives while presenting the image of a large form factor disk drive to the host computer. A plurality of the small form factor disk drives are dynamically interconnected to form a redundancy group to store the data records received from the host computer. The control unit for the disk array system allocates the physical memory locations on the small form factor disk drives in the redundancy groups to store data records that are received from the host computer. The control unit also maps the virtual address for each data record received from the host computer to physical memory location addresses on the plurality of small form factor disk drives in a selected redundancy group that are used to store the received data record. Therefore, a failure of the controller to properly note the correspondence between the data record virtual address and the physical memory locations on the plurality of disk drives that contain the data records results in the loss of the data. Furthermore, the data records and the physical memory location address information are concurrently transmitted from the controller and its associated cache memory to the disk controllers that interface the plurality of small form factor disk drives to a storage control unit that functions to interface with the host computer. Any errors in the transmission of the physical memory location address information from the disk storage controller to the disk controller would also result in the loss of the data since the disk controller would store the data records in the improper physical memory location on the plurality of small form factor disk drives. Therefore, when the storage control unit requests access to the data records using the address information from the mapping tables, the disk controller would retrieve data other than that requested by the storage control unit since the original data records were placed in memory locations other than that indicated by the address information contained in the mapping memory. It is therefore essential to ensure that no errors in the address information occur in either the mapping tables or in the transmission of address information within the data storage subsystem itself, such as between the storage control unit and the disk controller. There presently exists no method or apparatus to prevent the occurrence of errors within the data storage subsystem, such as in the transmission of address information from the storage control unit to the disk controllers.

SOLUTION

The above described problems are solved and a technical advance achieved in the field by the method and apparatus for ensuring data integrity in a dynamically mapped data storage subsystem. This is accomplished by making use of an error correcting code generated across the data as well as the associated address information for each data transfer within the data storage subsystem between a storage control unit and the memory controller for the data storage devices. The error correcting code that is used to safeguard the data is selected to have additional error detection and correction capacity above that needed for that purpose. This additional capacity is used to also protect the address information transmitted with the data record to ensure that the address information is also error free. The storage control unit, upon the initiation of a data record transfer to the memory controller, creates the error correcting code across the data record that is being transferred. The physical memory storage location address, assigned by the storage control unit, to store this particular data record is also input to the error correcting algorithm to provide address error protection. The memory controller, upon receipt of the data transmission from the storage control unit, recomputes the error correcting code across the received data and address information and compares the newly computed error code with that transmitted by the storage control unit to identify whether any errors occurred in the transmission of the data from the storage control unit to the memory controller. In this manner, not only the data but the address information is protected internal to the dynamically mapped data storage subsystem to provide a level of data integrity heretofore not available in data storage subsystems.

DETAILED DESCRIPTION OF THE DRAWING

A dynamically mapped virtual memory data storage subsystem is used to illustrate the data integrity feature of the present invention. This data storage subsystem uses a plurality of small form factor disk drives in place of a single large form factor disk drive to implement an inexpensive, high performance, high reliability disk drive array memory that emulates the format and capability of large form factor disk drives (DASD). The plurality of disk drives in the disk drive array data storage subsystem are configured into a plurality of variable size redundancy groups of N+M connected disk drives to store data thereon. Each redundancy group, also called a logical disk drive, is divided into a number of logical cylinders, each containing i logical tracks, one logical track for each of the i physical tracks contained in a cylinder of one physical disk drive. Each logical track is comprised of N+M physical tracks, one physical track from each disk drive in the redundancy group. The N+M disk drives are used to store N data segments, one on each of N physical tracks per logical track, and to store M redundancy segments, one on each of M physical tracks per logical track in the redundancy group. The N+M disk drives in a redundancy group have unsynchronized spindles and loosely coupled actuators. The data is transferred to the disk drives via independent reads and writes since all disk drives operate independently.

The disk drive array data storage subsystem includes a data storage management system that provides improved data storage and retrieval performance by dynamically mapping between virtual and physical data storage devices. The disk drive array data storage subsystem consists of three abstract layers: virtual, logical and physical. The virtual layer functions as a conventional large form factor disk drive memory. The logical layer functions as an array of storage units that are grouped into a plurality of redundancy groups, each containing N+M physical disk drives. The physical layer functions as a plurality of individual small form factor disk drives. The data storage management system operates to effectuate the dynamic mapping of data among these abstract layers and to control the allocation and management of the actual space on the physical devices. These data storage management functions are performed in a manner that renders the operation of the disk drive array data storage subsystem transparent to the host processor which perceives only the virtual image of the disk drive array data storage subsystem.

The performance of this system is enhanced by the use of a cache memory with both volatile and nonvolatile portions and "backend" data staging and destaging processes. No data stored in a redundancy group is modified. A virtual track is staged from a redundancy group into cache. The host then modifies some, perhaps all, of the records on the virtual track. Then, as determined by cache replacement algorithms such as Least Recently Used, etc, the modified virtual track is selected to be destaged to a redundancy group. When thus selected, a virtual track is divided (marked off) into several physical sectors to be stored on one or more physical tracks of one or more logical tracks. A complete physical track may contain physical sectors from one or more virtual tracks. Each physical track is combined with N−1 other physical tracks to form the N data segments of a logical track.

The original, unmodified data is simply flagged as obsolete. Obviously, as data is modified, the redundancy groups increasingly contain numerous virtual tracks of obsolete data. The remaining valid virtual tracks in a logical cylinder are read to the cache memory in a background "free space collection" process. They are then written to a previously emptied logical cylinder and the "collected" logical cylinder is tagged as being empty. Thus, all redundancy data creation, writing and free space collection occurs in background, rather than on-demand processes. This arrangement avoids the parity update problem of existing disk array systems and improves the response time versus access rate performance of the data storage subsystem by transferring these overhead tasks to background processes.

In this data storage subsystem, memory storage location addresses are dynamically assigned to the data as it is transferred into cache memory and between the cache memory and the backend data storage devices. Any corruption of these dynamically assigned addresses results in the loss of the data within the data storage subsystem. Therefore, the address information must be protected from errors as well as the data itself.

Data Storage Subsystem Architecture

Figure 1:
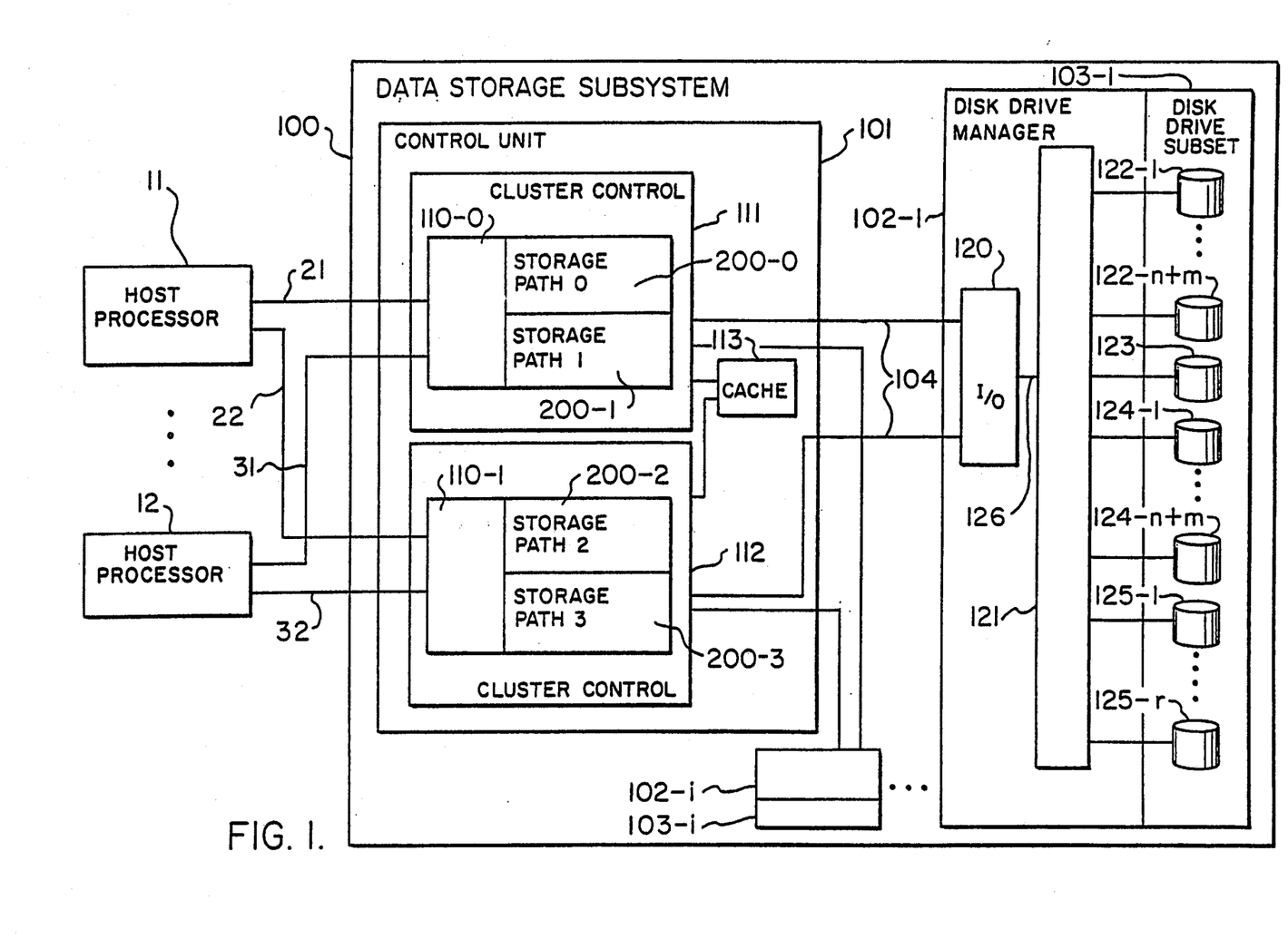
FIG. 1 illustrates in block diagram form the architecture of a disk drive array data storage subsystem.

FIG. 1 illustrates in block diagram form the architecture of the preferred embodiment of the disk drive array data storage subsystem 100. The disk drive array data storage subsystem 100 appears to the associated host processors 11-12 to be a collection of large form factor disk drives with their associated storage control, since the architecture of disk drive array data storage subsystem 100 is transparent to the associated host processors 11-12. This disk drive array data storage subsystem 100 includes a plurality of disk drives (ex 122-1 to 125-r) located in a plurality of disk drive subsets 103-1 to 103-i. The disk drives 122-1 to 125-r are significantly less expensive, even while providing disk drives to store redundancy information and providing disk drives for backup purposes, than the typical 14 inch form factor disk drive with an associated backup disk drive. The plurality of disk drives 122-1 to 125-r are typically the commodity hard disk drives in the 5¼ inch form factor.

The architecture illustrated in FIG. 1 is that of a plurality of host processors 11-12 interconnected via the respective plurality of data channels 21, 22-31, 32, respectively to a data storage subsystem 100 that provides the backend data storage capacity for the host processors 11-12. This basic configuration is well known in the data processing art. The data storage subsystem 100 includes a control unit 101 that serves to interconnect the subsets of disk drives 103-1 to 103-i and their associated drive managers 102-1 to 102-i with the data channels 21-22, 31-32 that interconnect data storage subsystem 100 with the plurality of host processors 11, 12.

Control unit 101 includes typically two cluster controls 111, 112 for redundancy purposes. Within a cluster control 111 the multipath storage director 110-0 provides a hardware interface to interconnect data channels 21, 31 to cluster control 111 contained in control unit 101. In this respect, the multipath storage director 110-0 provides a hardware interface to the associated data channels 21, 31 and provides a multiplex function to enable any attached data channel (such as 21) from any host processor such as 11) to interconnect to a selected cluster control 111 within control unit 101. The cluster control 111 itself provides a pair of storage paths 201-0, 201-1 which function as an interface to a plurality of optical fiber backend channels 104. In addition, the cluster control 111 includes a data compression function as well as a data routing function that enables cluster control 111 to direct the transfer of data between a selected data channel 21 and cache memory 113, and between cache memory 113 and one of the connected optical fiber backend channels 104. Control unit 101 provides the major data storage subsystem control functions that include the creation and regulation of data redundancy groups, reconstruction of data for a failed disk drive, switching a spare disk drive in place of a failed disk drive, data redundancy generation, logical device space management, and virtual to logical device mapping. These subsystem functions are discussed in further detail below.

Disk drive manager 102-1 interconnects the plurality of commodity disk drives 122-1 to 125-r included in disk drive subset 103-1 with the plurality of optical fiber backend channels 104. Disk drive manager 102-1 includes an input/output circuit 120 that provides a hardware interface to interconnect the optical fiber backend channels 104 with the data paths 126 that serve control and drive circuits 121. Control and drive circuits 121 receive the data on conductors 126 from input/output circuit 120 and convert the form and format of these signals as required by the associated commodity disk drives in disk drive subset 103-1. In addition, control and drive circuits 121 provide a control signalling interface to transfer signals between the disk drive subset 103-1 and control unit 101. The data that is written onto the disk drives in disk drive subset 103-1 consists of data that is transmitted from an associated host processor 11 over data channel 21 to one of cluster controls 111, 112 in control unit 101. The data is written into, for example, cluster control 111 which stores the data in cache 113. Cluster control 111 stores N physical tracks of data in cache 113 and then generates M redundancy segments for error correction purposes. Cluster control 111 then selects a subset of disk drives (122-1 to 122-n+m) to form a redundancy group to store the received data. Cluster control 111 selects an empty logical track, consisting of N+M physical tracks, in the selected redundancy group. Each of the N physical tracks of the data are written onto one of N disk drives in the selected data redundancy group. An additional M disk drives are used in the redundancy group to store the M redundancy segments. The M redundancy segments include error correction characters and data that can be used to verify the integrity of the N physical tracks that are stored on the N disk drives as well as to reconstruct one or more of the N physical tracks of the data if that physical track were lost due to a failure of the disk drive on which that physical track is stored.

Thus, data storage subsystem 100 can emulate one or more large form factor disk drives (such as an IBM 3390-3 type of disk drive) using a plurality of smaller form factor disk drives while providing a high reliability capability by writing the data across a plurality of the smaller form factor disk drives. A reliability improvement is also obtained by providing a pool of R backup disk drives (125-1 to 125-r) that are switchably interconnectable in place of a failed disk drive. Data reconstruction is accomplished by the use of the M redundancy segments, so that the data stored on the remaining functioning disk drives combined with the redundancy information stored in the redundancy segments can be used by control software in control unit 101 to reconstruct the data lost when one or more of the plurality of disk drives in the redundancy group fails (122-1 to 122-n+m). This arrangement provides a reliability capability similar to that obtained by disk shadowing arrangements at a significantly reduced cost over such an arrangement.

Control Unit

Figure 2:
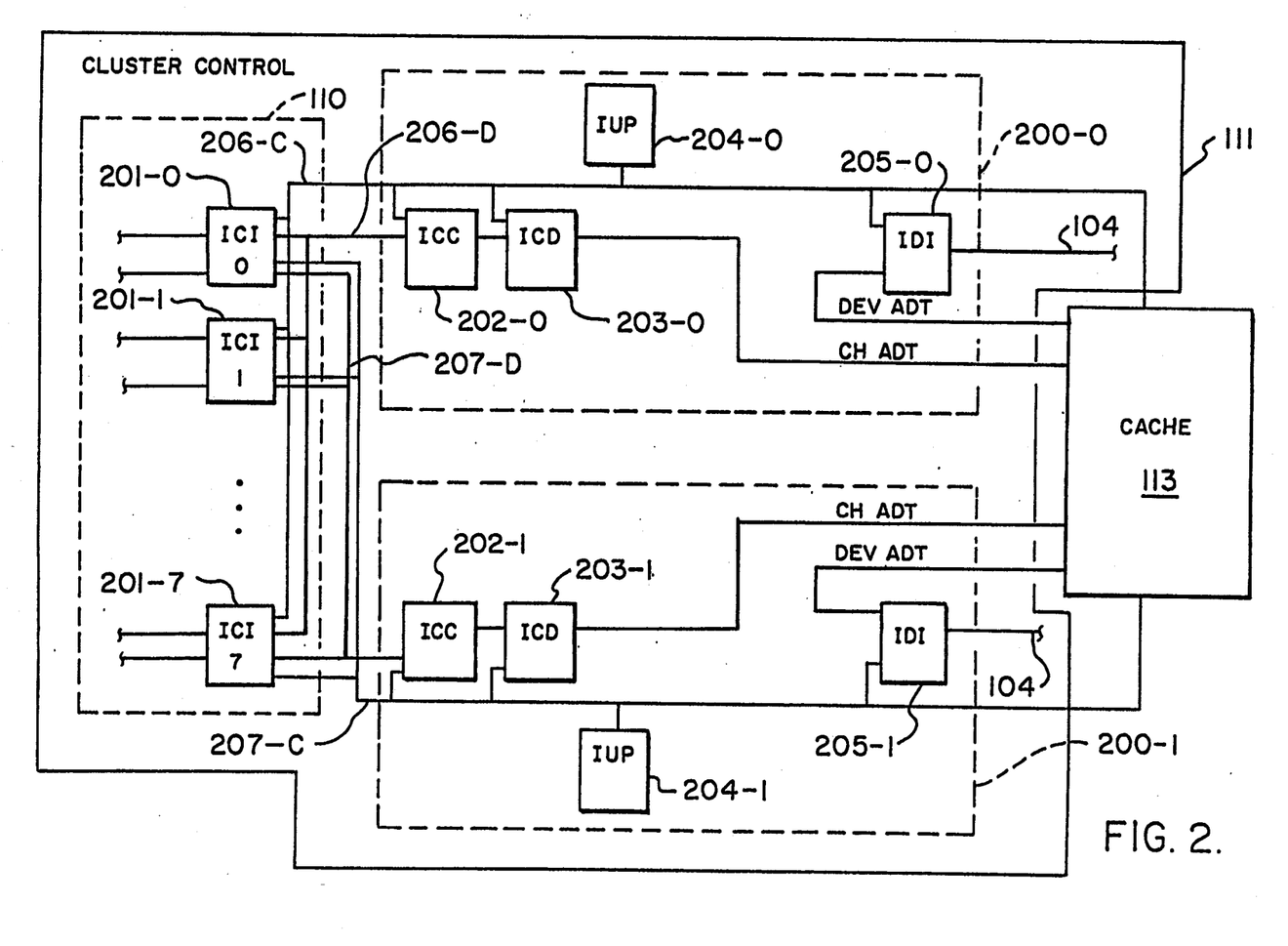
FIG. 2 illustrates the cluster control of the data storage subsystem.

FIG. 2 illustrates in block diagram form additional details of cluster control 111. Multipath storage director 110 includes a plurality of channel interface units 201-0 to 201-7, each of which terminates a corresponding pair of data channels 21, 31. The control and data signals received by the corresponding channel interface unit 201-0 are output on either of the corresponding control and data buses 206-C, 206-D, or 207-C, 207-D, respectively, to either storage path 200-0 or storage path 200-1. Thus, as can be seen from the structure of the cluster control 111 illustrated in FIG. 2, there is a significant amount of symmetry contained therein. Storage path 200-0 is identical to storage path 200-1 and only one of these is described herein. The multipath storage director 110 uses two sets of data and control busses 206-D, C and 207-D, C to interconnect each channel interface unit 201-0 to 201-7 with both storage path 200-0 and 200-1 so that the corresponding data channel 21 from the associated host processor 11 can be switched via either storage path 200-0 or 200-1 to the plurality of optical fiber backend channels 104. Within storage path 200-0 is contained a processor 204-0 that regulates the operation of storage path 200-0. In addition, an optical device interface 205-0 is provided to convert between the optical fiber signalling format of optical fiber backend channels 104 and the metallic conductors contained within storage path 200-0. Channel interface control 202-0 operates under control of processor 204-0 to control the flow of data to and from cache memory 113 and one of the channel interface units 201 that is presently active with storage path 200-0. The channel interface control 202-0 includes a cyclic redundancy check (CRC) generator/checker to generate and check the CRC bytes for the received data. The channel interface circuit 202-0 also includes a buffer that compensates for speed mismatch between the data transmission rate of the data channel 21 and the available data transfer capability of the cache memory 113. The data that is received by the channel interface control circuit 202-0 from a corresponding channel interface circuit 201 is forwarded to the cache memory 113 via channel data compression circuit 203-0. The channel data compression circuit 203-0 provides the necessary hardware and microcode to perform compression of the channel data for the control unit 101 on a data write from the host processor 11. It also performs the necessary decompression operation for control unit 101 on a data read operation by the host processor 11.

As can be seen from the architecture illustrated in FIG. 2, all data transfers between a host processor 11 and a redundancy group in the disk drive subsets 103 are routed through cache memory 113. Control of cache memory 113 is provided in control unit 101 by processor 204-0. The functions provided by processor 204-0 include initialization of the cache directory and other cache data structures, cache directory searching and management, cache space management, cache performance improvement algorithms as well as other cache control functions. In addition, processor 204-0 creates the redundancy groups from the disk drives in disk drive subsets 103 and maintains records of the status of those devices. Processor 204-0 also causes the redundancy data across the N data disks in a redundancy group to be generated within cache memory 113 and writes the M segments of redundancy data onto the M redundancy disks in the redundancy group. The functional software in processor 204-0 also manages the mappings from virtual to logical and from logical to physical devices. The tables that describe this mapping are updated, maintained, backed up and occasionally recovered by this functional software on processor 204-0. The free space collection function is also performed by processor 204-0 as well as management and scheduling of the optical fiber backend channels 104.

Many of these above functions are well known in the data processing art and are not described in any detail herein.

Dynamic Virtual Device to Logical Device Mapping

With respect to data transfer operations, all data transfers go through cache memory 113. Therefore, front end or channel transfer operations are completely independent of backend or device transfer operations. In this system, staging operations are similar to staging in other cached disk subsystems but destaging transfers are collected into groups for bulk transfers. In addition, this data storage subsystem 100 simultaneously performs free space collection, mapping table backup, and error recovery as background processes. Because of the complete front end/backend separation, the data storage subsystem 100 is liberated from the exacting processor timing dependencies of previous count key data disk subsystems. The subsystem is free to dedicate its processing resources to increasing performance through more intelligent scheduling and data transfer control.

The disk drive array data storage subsystem 100 consists of three abstract layers: virtual, logical and physical. The virtual layer functions as a conventional large form factor disk drive memory. The logical layer functions as an array of storage units that are grouped into a plurality of redundancy groups (such as 122-1 to 122-n+m), each containing N+M disk drives to store N physical tracks of data and M physical tracks of redundancy information for each logical track. The physical layer functions as a plurality of individual small form factor disk drives. The data storage management system operates to effectuate the mapping of data among these abstract layers and to control the allocation and management of the actual space on the physical devices. These data storage management functions are performed in a manner that renders the operation of the disk drive array data storage subsystem 100 transparent to the host processors (11-12).

A redundancy group consists of N+M disk drives. The redundancy group is also called a logical volume or a logical device. Within each logical device there are a plurality of logical tracks, each of which is the set of all physical tracks in the redundancy group which have the same physical track address. These logical tracks are also organized into logical cylinders, each of which is the collection of all logical tracks within a redundancy group which can be accessed at a common logical actuator position. A disk drive array data storage subsystem 100 appears to the host processor to be a collection of large form factor disk drives, each of which contains a predetermined number of tracks of a predetermined size called a virtual track. Therefore, when the host processor 11 transmits data over the data channel 21 to the data storage subsystem 100, the data is transmitted in the form of the individual records of a virtual track. In order to render the operation of the disk drive array data storage subsystem 100 transparent to the host processor 11, the received data is stored on the actual physical disk drives (122-1 to 122-n+m) in the form of virtual track instances which reflect the capacity of a track on the large form factor disk drive that is emulated by data storage subsystem 100. Although a virtual track instance may spill over from one physical track to the next physical track, a virtual track instance is not permitted to spill over from one logical cylinder to another. This is done in order to simplify the management of the memory space. In addition, virtual track instances are padded out if necessary to fit into an integral number of physical device sectors. This is to insure that each virtual track instance starts on a sector boundary of the physical device.

Mapping Tables

It is necessary to accurately record the location of all data within the disk drive array data storage subsystem 100 since the data received from the host processors 11-12 is mapped from its address in the virtual space to a physical location in the subsystem in a dynamic fashion. A virtual track directory is maintained to recall the location of the current instance of each virtual track in the disk drive array data storage subsystem 100. The virtual track directory consists of an entry for each virtual track which the associated host processor 11 can address. The entry usually contains the logical sector address at which the virtual track instance begins. The virtual track directory entry also contains data indicative of the length of the virtual track instance in sectors. The virtual track directory is stored in noncontiguous pieces of the cache memory 113 and is addressed indirectly through pointers in a virtual device table. The virtual track directory is updated whenever a new virtual track instance is written to the disk drives.

Virtual Track Directory

Figure 3:
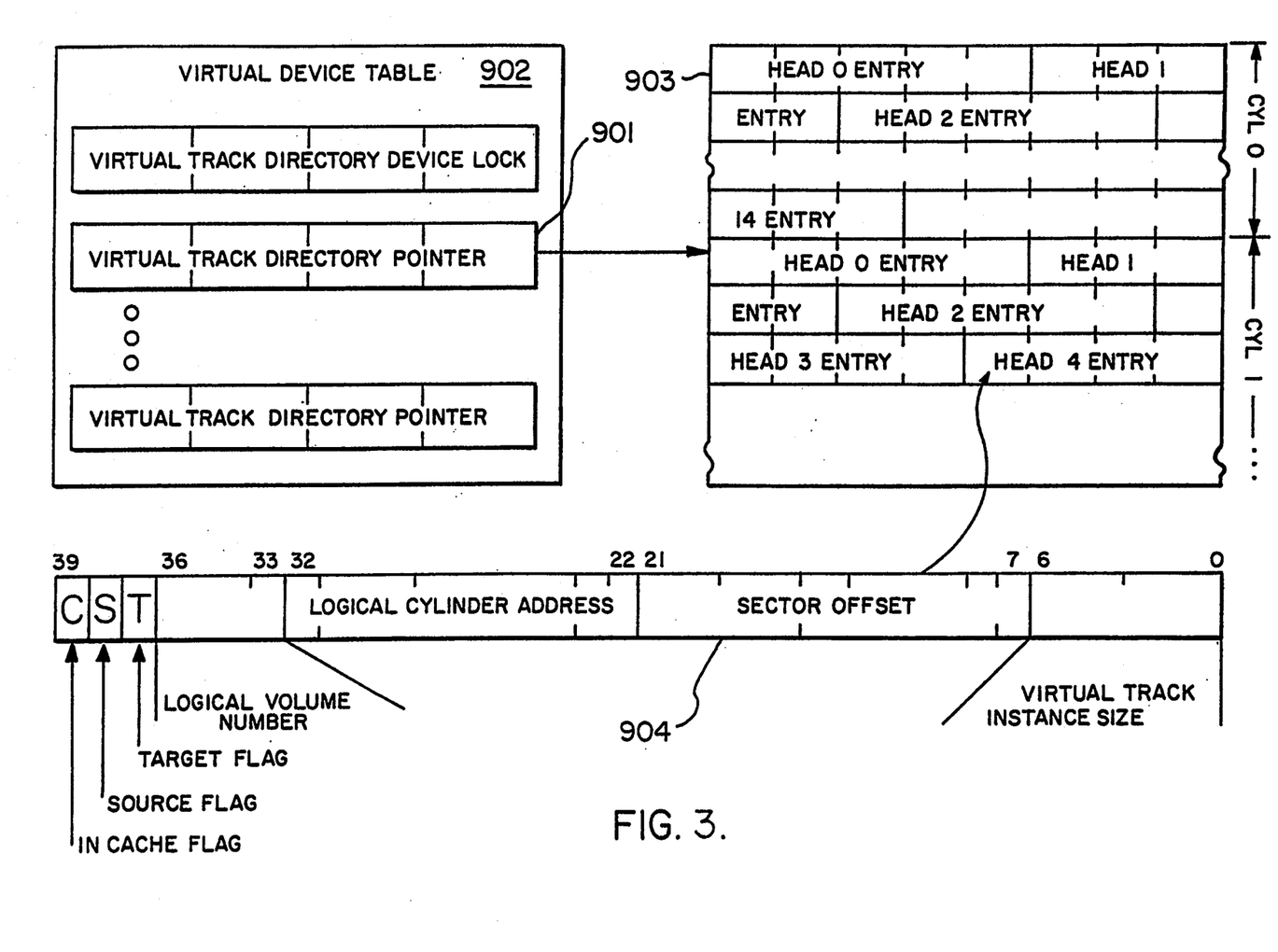
FIG. 3 illustrates the format of the virtual track directory.

FIG. 3 illustrates the format of the virtual track directory 900 that is contained within cache memory 113. The virtual track directory 900 consists of the tables that map the virtual addresses as presented by host processor 11 to the logical drive addresses that is used by control unit 101. There is another mapping that takes place within control unit 101 and this is the logical to physical mapping to translate the logical address defined by the virtual track directory 900 into the exact physical location of the particular disk drive that contains data identified by the host processor 11. The virtual track directory 900 is made up of two parts: the virtual track directory pointers 901 in the virtual device table 902 and the virtual track directory 903 itself. The virtual track directory 903 is not contiguous in cache memory 113 but is scattered about the physical extent of cache memory 113 in predefined segments (such as 903-1). Each segment 903-1 has a virtual to logical mapping for a predetermined number of cylinders, for example 102 cylinders worth of IBM 3390-3 type DASD tracks. In the virtual device table 902, there are pointers to as many of these segments 903 as needed to emulate the number of cylinders configured for each of the virtual devices defined by host processor 11. The virtual track directory 900 is created by control unit 101 at the virtual device configuration time. When a virtual volume is configured, the number of cylinders in that volume is defined by the host processor 11. A segment 903-1 or a plurality of segments of volatile cache memory 113 are allocated to this virtual volume defined by host processor 11 and the virtual device table 902 is updated with the pointers to identify these segments 903 contained within cache memory 113. Each segment 903 is initialized with no pointers to indicate that the virtual tracks contained on this virtual volume have not yet been written. Each entry 905 in the virtual device table is for a single virtual track and is addressed by the virtual track address. As shown in FIG. 3, each entry 905 is 40 bits long. If the Format Flag is clear the entry 905 contents are as follows starting with the high order bits:

Bit 39: Format Flag: When set this flag indicates that this entry contains format information.

Bit 38: Source Flag.

Bit 37: Target Flag.

Bits 36-33: Logical volume number.

Bits 32-22: Logical cylinder address. This data entry is identical to the physical cylinder number.

Bits 21-7: Sector offset. This entry is the offset to the start of the virtual track instance in the logical cylinder, not including the redundancy track sectors. These sectors typically contained 512 bytes.

Bits 6-0: Virtual track instance size. This entry notes the number of sectors that are required to store this virtual track instance.

Figure 5:
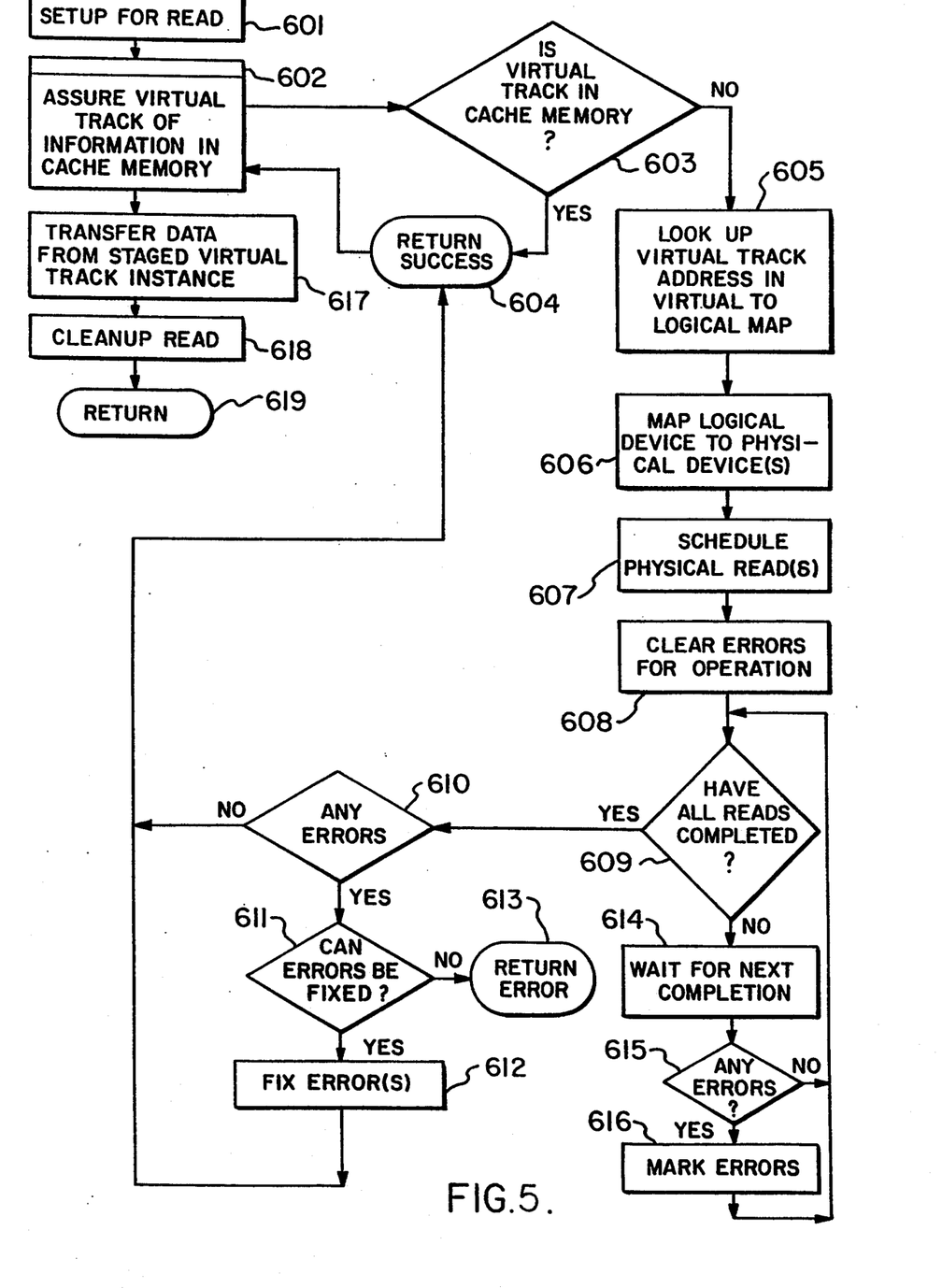
FIGS. 5 and 6 illustrate, in flow diagram form, the operational steps taken to perform a data read and write operation, respectively.

If the Format Flag is set, then the Virtual Track Directory Entry contains format information as follows:

Bit 39: Format Flag
Bits 38-32: Number of Records per Track
Bits 31-24: Encoded Data Record Size
Bits 23-16: Key Field Length
Bits 15-0: Relative Cylinder Address Data Read Operation FIG. 5 illustrates in flow diagram form the operational steps taken by processor 204 in control unit 101 of the data storage subsystem 100 to read data from a data redundancy group 122-1 to 122-n+m in the disk drive subsets 103. The disk drive array data storage subsystem 100 supports reads of any size. However, the logical layer only supports reads of virtual track instances. In order to perform a read operation, the virtual track instance that contains the data to be read is staged from the logical layer into the cache memory 113. The data record is then transferred from the cache memory 113 and any clean up is performed to complete the read operation.

At step 601, the control unit 101 prepares to read a record from a virtual track. At step 602, the control unit 101 branches to the cache directory search subroutine to assure that the virtual track is located in the cache memory 113 since the virtual track may already have been staged into the cache memory 113 and stored therein in addition to having a copy stored on the plurality of disk drives (122-1 to 122-n+m) that constitute the redundancy group in which the virtual track is stored. At step 603, the control unit 101 scans the hash table directory of the cache memory 113 to determine whether the requested virtual track is located in the cache memory 113. If it is, at step 604 control returns back to the main read operation routine and the cache staging subroutine that constitutes steps 605-616 and 620-621 is terminated.

Assume, for the purpose of this description, that the virtual track that has been requested is not located in the cache memory 113. Processing proceeds to step 605 where the control unit 101 reads the Virtual Track Directory (VTD) Entry and processing proceeds to step 620. If this is a normal read, the VTD Entry contains the Logical Address of the data, that is the location of the Virtual Track in the disk arrays. However, if this is a stage in preparation for a write, the VTD Entry may contain format information only. If the Format Flag in the VTD Entry is set, processing proceeds to step 621. At step 621, space is allocated in cache memory 113 for the virtual track. That space in cache memory is formatted using the format information read from the VTD Entry. Then processing returns back to the main routine at step 604 where the formatted track in cache is ready to receive host records. If at step 620 the Format Flag in the VTD Entry is clear, then the VTD Entry contains the Logical Address of the Virtual Track and processing proceeds to step 606. At step 606, the logical map location is used to map the logical device to one or more physical devices in the redundancy group. At step 607, the control unit 101 schedules one or more physical read operations to retrieve the virtual track instance from appropriate ones of identified physical devices 122-1 to 122-n+m. At step 608, the control unit 101 clears errors for these operations. At step 609, a determination is made whether all the reads have been completed, since the requested virtual track instance may be stored on more than one of the N+M disk drives in a redundancy group. If all of the reads have not been completed, processing proceeds to step 614 where the control unit 101 waits for the next completion of a read operation by one of the N+M disk drives in the redundancy group. At step 615 the next reading disk drive has completed its operation and a determination is made whether there are any errors in the read operation that has just been completed. If there are errors, at step 616 the errors are marked and control proceeds back to the beginning of step 609 where a determination is made whether all the reads have been completed. If at this point all the reads have been completed and all portions of the virtual track instance have been retrieved from the redundancy group, then processing proceeds to step 610 where a determination is made whether there are any errors in the reads that have been completed. If errors are detected then at step 611 a determination is made whether the errors can be fixed. One error correction method is the use of a Reed-Solomon error detection/correction code to recreate the data that cannot be read directly. If the errors cannot be repaired then a flag is set to indicate to the control unit 101 that the virtual track instance can not be read accurately. If the errors can be fixed, then in step 612 the identified errors are corrected and processing returns back to the main routine at step 604 where a successful read of the virtual track instance from the redundancy group to the cache memory 113 has been completed.

At step 617, control unit 101 transfers the requested data record from the staged virtual track instance in which it is presently stored. Once the records of interest from the staged virtual track have been transferred to the host processor 11 that requested this information, then at step 618 the control unit 101 cleans up the read operation by performing the administrative tasks necessary to place all of the apparatus required to stage the virtual track instance from the redundancy group to the cache memory 113 into an idle state and control returns at step 619 to service the next operation that is requested.

Data Write Operation

Figure 6:
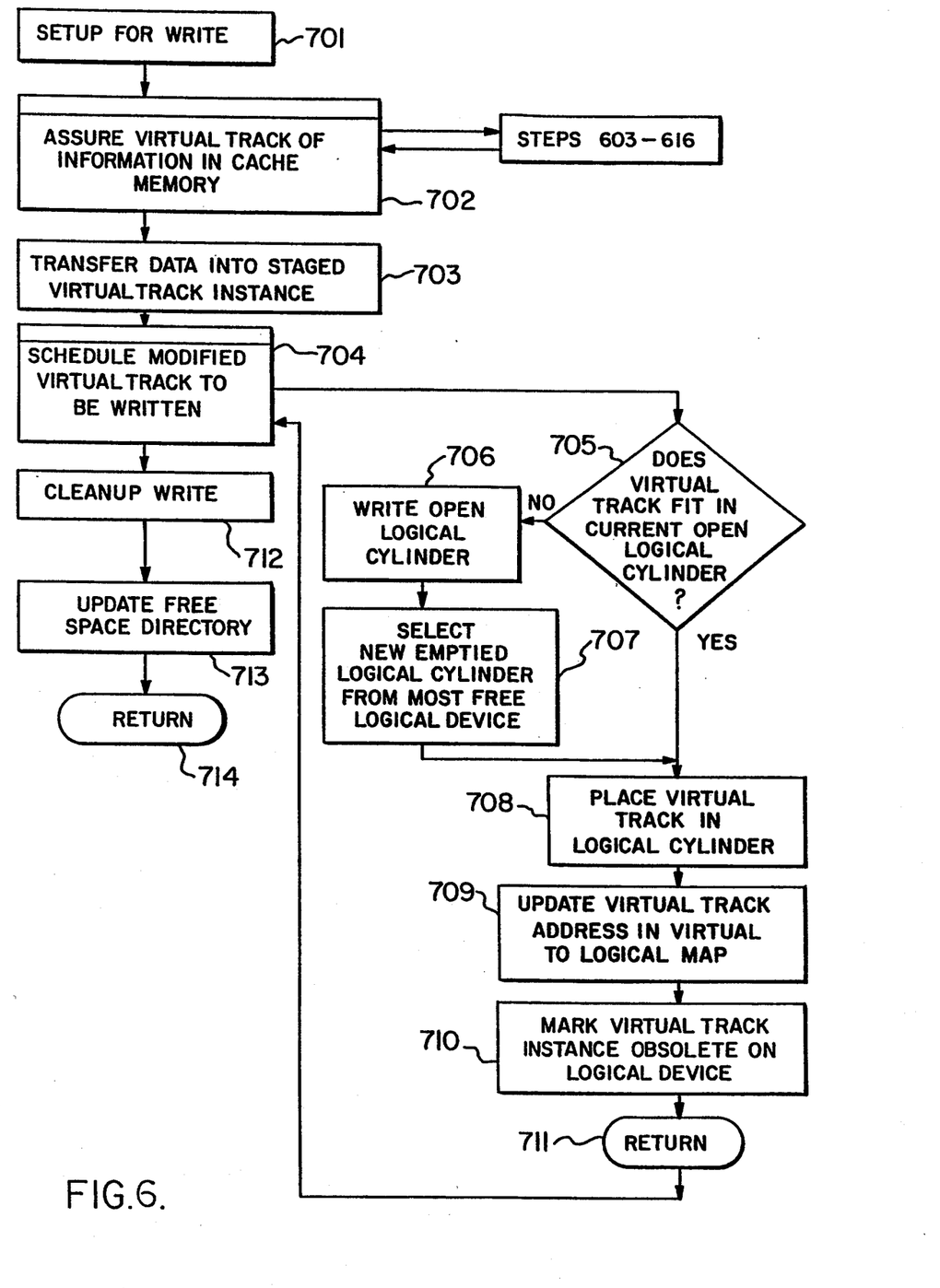

FIG. 6 illustrates in flow diagram form the operational steps taken by the disk drive array data storage subsystem 100 to perform a data write operation. The disk drive array data storage subsystem 100 supports writes of any size, but again, the logical layer only supports writes of virtual track instances. Therefore in order to perform a write operation, the virtual track that contains the data record to be rewritten is staged from the logical layer into the cache memory 113. Once the write operation is complete, the location of the obsolete instance of the virtual track is marked as free space. The modified data record is then transferred into the virtual track and this updated virtual track instance is then scheduled to be written from the cache memory 113 where the data record modification has taken place into the logical layer. Any clean up of the write operation is then performed once this transfer and write is completed.

At step 701, the control unit 101 performs the set up for a write operation and at step 702, as with the read operation described above, the control unit 101 branches to the cache directory search subroutine to assure that the virtual track into which the data is to be transferred is located in the cache memory 113. Since all of the data updating is performed in the cache memory 113, the virtual track in which this data is to be written must be transferred from the redundancy group in which it is stored to the cache memory 113 if it is not already resident in the cache memory 113. The transfer of the requested virtual track instance to the cache memory 113 is performed for a write operation as it is described above with respect to a data read operation and constitutes steps 603–616 and 620–621 illustrated in FIG. 5 above.

At step 703, the control unit 101 marks the virtual track instance that is stored in the redundancy group as invalid in order to assure that the logical location at which this virtual track instance is stored is not accessed in response to another host processor 12 attempting to read or write the same virtual track. Since the modified record data is to be written into this virtual track in the cache memory 113, the copy of the virtual track that resides in the redundancy group is now inaccurate and must be removed from access by the host processors 11–12. At step 704, the control unit 101 transfers the modified record data received from host processor 11 into the virtual track that has been retrieved from the redundancy group into the cache memory 113 to thereby merge this modified record data into the original virtual track instance that was retrieved from the redundancy group. Once this merge has been completed and the virtual track now is updated with the modified record data received from host processor 11, the control unit 101 must schedule this updated virtual track instance to be written onto a redundancy group somewhere in the disk drive array data storage subsystem 100.

This scheduling is accomplished by the subroutine that consists of steps 706–711. At step 706, the control unit 101 determines whether the virtual track instance as updated fits into an available open logical cylinder. If it does not fit into an available open logical cylinder, then at step 707 then this presently open logical cylinder must be closed out and written to the physical layer and another logical cylinder selected from the most free logical device or redundancy group in the disk drive array data storage subsystem 100. At step 708, the selection of a free logical cylinder from the most free logical device takes place. This ensures that the data files received from host processor 11 are distributed across the plurality of redundancy groups in the disk drive array data storage subsystem 100 in an even manner to avoid overloading certain redundancy groups while underloading other redundancy groups. Once a free logical cylinder is available, either being the presently open logical cylinder or a newly selected logical cylinder, then at step 709, the control unit 101 writes the updated virtual track instance as well as the disk formatting data associated with this virtual track instance into the logical cylinder and at step 710 the new location of the virtual track is placed in the virtual track directory in order to render it available to the host processors 11–12. At step 711, control returns to the main routine, where at step 712 the control unit 101 cleans up the remaining administrative tasks to complete the write operation and return to an available state at 712 for further read or write operations from host processor 11.

Cache Memory

Figure 4:
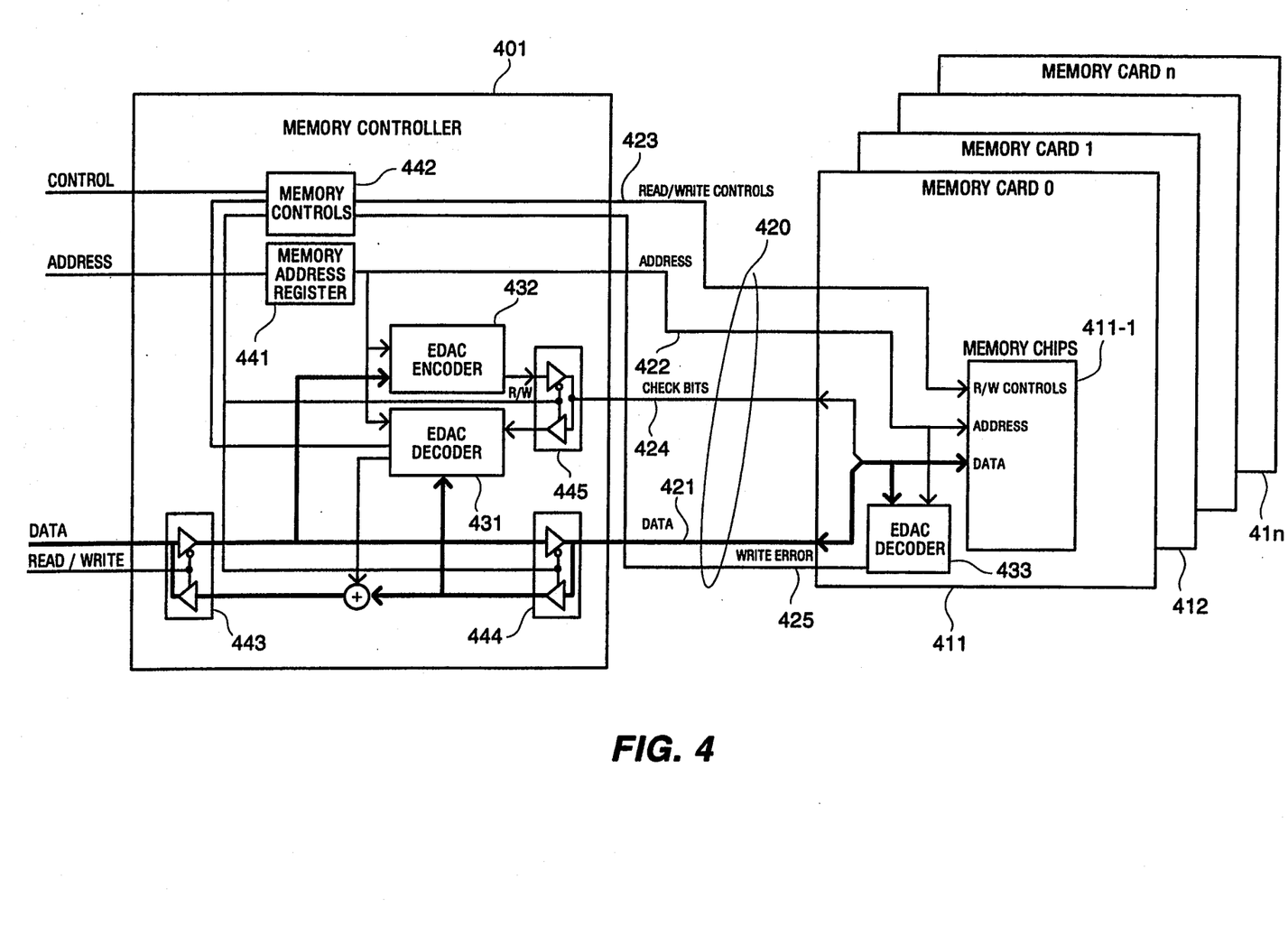
FIG. 4 illustrates additional details of the cache memory.

FIG. 4 illustrates in block diagram form the details of the cache memory circuit 113. The cache memory 113 consists of a memory controller 401 and a plurality of memory devices 411-41n that are used to store the data records received from the host processor 11. The memory devices 411-41n in this particular embodiment are printed circuit cards, each of which contains a plurality of integrated circuit memory devices 411-1. The memory controller 401 consists of a control circuit 442 that regulates the operation of the plurality of memory devices 411-41n. The memory controller 401 and the memory devices 411-41n are interconnected by a plurality of signal leads 421–424 which collectively are called the cache memory bus 420. The cache memory bus 420 includes address 421 and data 422 leads as well as control leads 423,424 to carry the read/write control signals and the check bits that are created by the error detection 431 and correction 432 circuits.

In operation, the memory controller 401 receives data records that are transmitted to the data storage subsystem 100 by the host processor 11. When a data record is to be written to the memory devices 411-41n in the cache memory 113, control signals are transmitted by processor 204-1 to the memory controller 401. In response to the memory control signals, memory address register 441 generates a memory address indicative of the physical memory location of available memory space in a selected one 411 of the memory devices 411-41n. The generated memory address is transmitted on the address leads 422 of the cache memory bus 420 concurrently with the data record that is passed through the memory controller 401 via gates 443,444 over the data leads 421 of the cache memory bus 420 to the selected memory device 411. Concurrently, memory control circuit 442 generates read/write control signals that are applied to the control leads 423 of cache memory bus 420 to select and activate memory device 411. Upon receipt of the address, write control signals and the data via cache memory bus 420, the selected memory device 411 stores the received data record in the particular physical memory location identified by the address signals.

When the data record is to be retrieved from the selected memory device 411, the read control signals are transmitted by processor 204-1 to the memory controller 401 which scans its mapping table to identify the physical memory location in one of the selected memory devices 411 that stores the requested data record. Memory control circuit 442 transmits a read control signal over the control leads 423 of the cache memory bus 420 concurrently with memory address register 441 transmitting, via address leads 422 of cache memory bus 420, the memory address of the physical memory location on the selected memory device 411 that stores the requested data record. Upon receipt of the read control signal and address on the cache memory bus 420, the selected memory device 411 retrieves the requested data record from the identified physical memory location on the memory device 411 and transmits this retrieved data record over the data leads 421 of the cache memory bus 420 to the memory controller 401. This data is forwarded through the memory controller 401 via gates 443,444 to the storage control unit 201.

Error Detection and Correction

Within this architecture, error detection and correction 431–433 circuits are provided to ensure that the data that is stored and retrieved on the memory devices 411-41n do not contain any errors. The error detection and correction circuits 431–433 consist of an EDAC encoder 432 and an EDAC decoder 431 located in the memory controller 401 as well as an EDAC decoder 433 in each of the memory devices 411-41n. To provide the high data integrity required in a dynamically mapped virtual memory system, the error detection and correction circuits 431–433 make use of a double error correcting and triple error detecting code. This code makes use of a (127,112) BCH code to detect and correct errors in the data record that is stored in the memory devices 411-41n. Data is stored in the memory devices 411-41n as sixty-four bit double words and a (127,112) BCH code is required to be able to detect three errors and correct double errors in data words of this length. The next smaller double error correcting and triple error detecting BCH code is a (63, 50) code and would be too small for the size of the data words that are stored in the memory devices 411-41n. Therefore, the BCH code word generated by the EDAC encoder 432 is of a form (N, K) where N is the total number of bits in the entire word and K is the number of bits in the data that is stored in the word. The (127, 112) BCH code protects 112 bits of data by generating fifteen check bits. However, in this particular application, the data words that are protected are only sixty-four bits in length, thereby leaving forty-eight unused data bits that can be protected by the fifteen check bits generated by this (127, 112) BCH code. Since the cache memory address space is represented by thirty bits of address, the EDAC encoder 432 encodes both the sixty-four bit data word and the corresponding thirty bits of address information to produce fifteen check bits over both the address and the data that is to be stored on the selected memory device 411. Since the thirty bits of address information must be transmitted over the cache memory bus 420 to the selected memory device 411, and the fifteen check bits must be generated whether over just the data word or the combination of data word and corresponding memory address, this method of providing data integrity does not require the transmission of any additional bits to the memory devices 411-41n nor does it require any additional control circuitry since the EDAC encoder 432 and decoder 431 have spare capacity. Furthermore, by including an EDAC decoder 433 in each memory device 411-41n, the address and data bits that are transmitted by the memory controller 401 can be checked as the data is being written to the designated physical memory location in the selected memory device 411 rather than waiting until the data is read from that location to determine whether there are any errors in the address or data information that is transmitted by the memory controller 401. This dynamic verification of data integrity during the write process improves the error recovery capabilities of the data storage subsystem 100 since the host processor 11 can be requested to retransmit the data if an unrecoverable error occurs in the transmission and storage of the data on the selected memory devices 411.

As can be seen from FIG. 4, the EDAC encoder 432 receives the memory address information from memory address register 441 as well as the received data record via gates 443 as inputs thereto and produces the fifteen check bits that are transmitted via gates 445 and check bits leads 424 of the cache memory bus 420 along with the memory address on address leads 422 and data record on data leads 421 to the selected memory device 411. The address information is used to select the physical memory location that is to store the received data record. A write control signal transmitted by memory control circuit 442 on read/write control signal leads 423 of cache memory bus 420 is used to enable the particular memory device chips 411-1 on the selected memory device 411 to store the data record that is applied over the data leads 421 of the cache memory bus 420 in the physical memory location designated by the address information carried on the address leads 422 of the cache memory bus 420. As the data record is being written to this selected memory location, the address and data are input to the EDAC decoder 433 along with the fifteen generated check bits carried on check bits leads 424 to generate a residue, to determine whether any errors have occurred at that address location. If the residue calculated by EDAC decoder 433 is not zero, then an error has occurred in either the address or the data that is transmitted over the cache memory bus 420. With the fifteen bits of error detection and correction information, three erroneous bits can be detected and two erroneous bits can be corrected by generating syndromes from the residue to yield the identification of the error location in the received information. The errors can then be optionally corrected in the identified bit positions in the selected physical memory location in this selected memory device 411 before the write operation is completed. If the errors are greater than the capacity of the EDAC decoder circuit 433 to correct, (or optionally if any error is detected) then a write error signal is transmitted by the selected memory device 411 over the write error lead 425 to the memory controller 401 to indicate that the entire data record must be rewritten, since an unrecoverable error has occurred.

Therefore, the cache memory 113 illustrated in FIG. 4 ensures the integrity of both the address and data that is transmitted to the memory devices 411-41n and the memory devices 411-41n themselves immediately perform an error check on the data and address information as the data is being written to the selected memory location on the selected memory device 411. The check bits that are transmitted from the memory controller 401 are stored with the data record to enable the memory controller 401 to perform a data integrity check during a read operation.

During a read operation, the memory address register 441 transmits a memory address over the address leads 422 of the cache memory bus 420 to a selected memory device 411 to retrieve a requested data record therefrom. A read control signal is concurrently applied by memory control circuit 442 to the control leads 423 of the cache memory bus 420 to activate the selected memory device 411 to retrieve the requested data record and apply this data record to the data leads 421 of the cache memory bus 420. As the data is being read out of the selected memory device 411, it is applied in the memory controller 401 via gates 444 to the EDAC decoder 431 along with the address information from the memory address register 441. The EDAC decoder 431 calculates the residue from the data record, check bits that are read from the selected memory device 411 as well as from the memory address applied to the EDAC decoder 431 by the memory address register 441. If the residue is not zero, then an error has occurred at that address location in retrieving the data record. Since the fifteen bits of error code are produced over both the memory address and the data record, up to three bit errors in either the address or the data record can be identified. The selected (127, 112) BCH code can detect up to three errors and correct up to two errors, thereby enabling the EDAC decoder 431 to output control signals to the memory control circuit 442 of the memory controller 401 to indicate whether a single bit data error, or a two bit data error, or a single bit address error, or two bit address error, or an uncorrectable error has been located. If a single or double bit error has occurred in the data, then the EDAC decoder 431 can correct these errors as the data record is being read from the selected memory device 411.

The above-described use of the data integrity method and apparatus within cache memory 113 is also applicable to transfers of data between cache memory 113 and the disk drives 12*-* in the redundancy groups of disk drive array data storage subsystem 100. Furthermore, while a disk drive array storage configuration is disclosed, these concepts are applicable to any data storage subsystem.

Summary

The data integrity method and apparatus of the present invention produces error detection and correction codes over both the data and its memory address as this information is being transmitted from the memory controller to the memory devices. The integrity of both the memory address and data is confirmed in the memory device by use of an EDAC decoder circuit to ensure that the data is written at the proper memory address location and contains no errors therein during the write process. Furthermore, an EDAC decoder is provided in the memory controller to ensure the integrity of the data records that are read out of the memory devices as well as their corresponding memory addresses to minimize the possibility that an addressing error or a data write error or read error has occurred in the storage and retrieval process. The use of the additional decoder circuits in each memory device as well as protecting the address information as well as the data provides a level of data integrity not found in existing data storage subsystems. This is extremely critical in a dynamically mapped virtual memory system such as a disk array data storage subsystem since the address of the data records are mapped from the virtual address assigned by the host processor to a physical memory address known only to the data storage subsystem.

While a specific embodiment of this invention has been disclosed herein, it is expected that those skilled in the art can design other embodiments that differ from this particular embodiment but fall within the scope of the appended claims.

We claim:

1. In a data storage subsystem, a memory for storing data records received from a host processor, comprising:
    a plurality of memory devices for storing data records received from a host processor;
    means, responsive to the receipt of a data record from said host processor, for generating a memory address to identify available memory space in a selected one of said memory devices to store said received data record thereon;
    means for generating a multi-bit error detecting and correcting code across both said received data record and said generated memory address; and
    means for writing said received data record and said generated multi-bit error detecting and correcting code associated with said received data record in said available memory space in said selected one memory device.

2. The system of claim 1 further comprising:
    means, responsive to the subsequent receipt from said host processor of a request to read a data record from said data storage subsystem, for generating a memory address indicative of a memory location on one of said memory devices on which said requested data record is written;
    means for retrieving said requested data record from said one memory device using said generated requested data record memory address;
    means for retrieving a multi-bit error detecting and correcting code, stored with said requested data record, from said one memory device; and
    means for comparing said generated requested data record memory address and said requested data record with said retrieved multi-bit error detecting and correcting code, stored with said requested data record to determine whether errors are contained in said generated requested data record memory address and said requested data record.

3. The system of claim 2 further comprising:
    means for identifying a bit location in said generated requested data record memory address and said requested data record that is in error.

4. The system of claim 1 further comprising:
    means in each said memory device responsive to the receipt of a data record and said generated multi-bit error detecting and correcting code associated with said received data record for comparing said generated memory address and said received data record with said multi-bit error detecting and correcting code to determine whether errors are contained in said generated memory address and said received data record.

5. The system of claim 4 wherein each said memory device further comprises:
    means for generating an error indication signal indicative of a failure of said generated memory address and said received data record to match said generated multi-bit error detecting and correcting code.

6. In a data storage subsystem having a memory for storing data records received from host processor, said memory having a plurality of memory devices, a method of detecting address and data errors comprising the steps of:
    generating, in response to the receipt of a data record from said host processor, a memory address to identify available memory space in a selected one of said memory devices to store said received data record thereon;
    generating a multi-bit error detecting and correcting code across both said received data record and said generated memory address; and
    writing said received data record and said generated multibit error detecting and correcting code associated with said received data record in said available memory space in said selected one memory device.

7. The method of claim 6 further comprising the steps of:
    generating, in response to the subsequent receipt from said host processor of a request to read a data record from said data storage subsystem, a memory address indicative of a memory location on one of said memory devices on which said requested data record is written;

retrieving said requested data record from said one memory device using said generated requested data record memory address;

retrieving a multi-bit error detecting and correcting code, stored with said requested data record, from said one memory device; and comparing said generated requested data record memory address and said requested data record with said retrieved multi-bit error detecting and correcting code, stored with said requested data record to determine whether errors are contained in said generated requested data record memory address and said requested data record.

8. The method of claim 7 further comprising the step of:

identifying a bit location in said generated requested data record memory address and said requested data record that is in error.

9. The method of claim 6 further comprising the step of:

comparing, in each said memory device in response to the receipt of a data record and said generated multi-bit error detecting and correcting code associated with said received data record, said generated memory address and said received data record with said generated multi-bit error detecting and correcting code to determine whether errors are contained in said generated memory address and said received data record.

10. The method of claim 9 further comprising the step of:

generating an error indication signal
indicative of a failure of said generated memory address and received data record to match said generated error detecting and correcting code.

* * * * *